United States Patent [19]
Whilden, Jr. et al.

[11] Patent Number: 5,033,159
[45] Date of Patent: Jul. 23, 1991

[54] METHOD OF CLEANING UP SPILLED OIL

[76] Inventors: Paul Whilden, Jr., P.O. Box 71, Leesburg, N.J. 08327; Paul Whilden, III, 326 Battle La., Millville, N.J. 08332

[21] Appl. No.: 406,977
[22] Filed: Sep. 13, 1989
[51] Int. Cl.⁵ .............................. E02B 15/04
[52] U.S. Cl. ............................... 15/353; 15/422
[58] Field of Search .................. 210/242.3, 922, 923, 210/924; 15/353, 321, 322, 422

[56] References Cited

U.S. PATENT DOCUMENTS

| | | | |
|---|---|---|---|
| 2,531,920 | 11/1950 | Raminger | 15/422 |
| 2,533,663 | 12/1950 | Johnson | 15/422 X |
| 3,922,225 | 11/1975 | Strain | 210/242.3 |
| 4,060,487 | 11/1977 | Samsel | 210/923 X |
| 4,083,077 | 4/1978 | Knight et al. | 15/422 X |
| 4,108,773 | 8/1978 | Macaluso | 210/242.3 X |
| 4,203,842 | 5/1980 | DiPerna | 210/242.3 |
| 4,209,400 | 6/1980 | Mayes | 210/242.3 X |
| 4,492,001 | 1/1985 | Hedrenius | 15/320 |

Primary Examiner—Chris K. Moore
Attorney, Agent, or Firm—Kimmel, Crowell & Weaver

[57] ABSTRACT

This invention provides a process for recovery of oil from non-oleophilic areas and surfaces such as rocks, beaches and shorelines by the use of hand-held vacuum nozzles connected to flexible tubing conveying the recovered oil to a first vessel from which the oil is transferred under pressure to a second vessel serving as a storage and transfer vessel to a third vessel which takes the oil to a recovery facility.

1 Claim, 4 Drawing Sheets

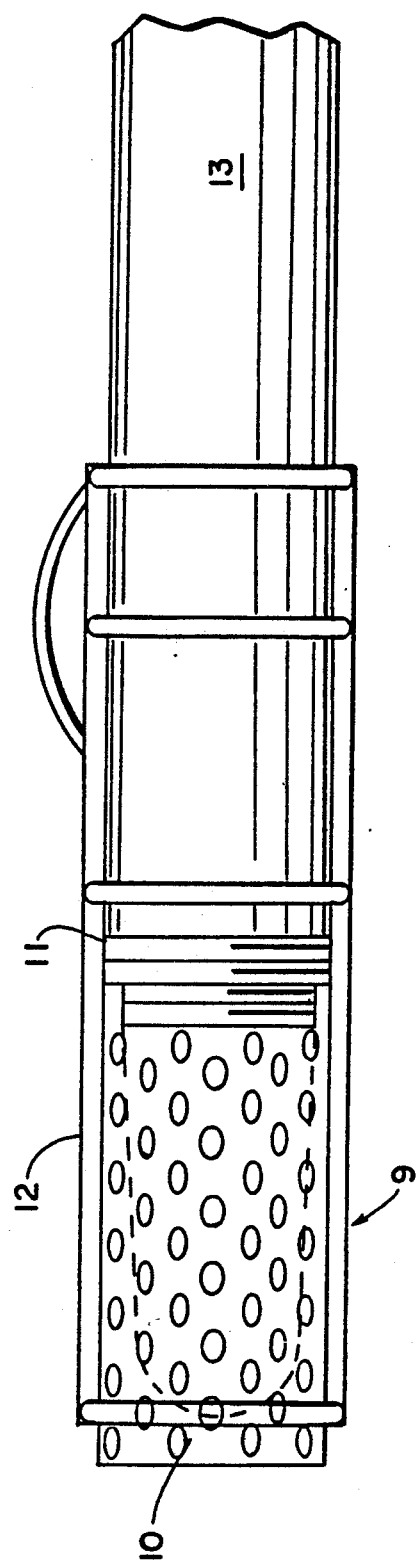

METHOD OF CLEANING UP SPILLED OIL

FIELD OF THE INVENTION

The present invention relates to a method for removing oil from the surface of water and more particularly from beaches and shorelines.

BACKGROUND OF THE PRIOR ART

The spillage of oil at sea is a matter of great concern to environmentalists, fishermen, oil producers and others for whom the containment of spilled oil requires quick and efficient action to abate oil pollution.

In the open sea, oil tends to float on the surface of calm water but wave action causes this floating oil to mix with sand and rocks on the beach. Once mixed, the oil may remain or may be taken out to sea where it slowly sinks to the bottom of the seafloor.

For the removal of oil floating on the surface of the water, mechanical devices such as skimmers have been used. However, as the name implies, these devices function best on calm seas where their skimming process can be best effected and the oil removed from the sea is thick and viscous tending to clump so that there is little oil-water mixing.

In addition, when skimmers are extended over wide areas of the spill-area, they tend to trap whatever else floats on the water, in addition to the oil, including debris. In arctic areas, ice may also be drawn into the skimmed area interfering with the clean-up process.

Absorbing devices have been used heretofore with some success but they function by having their surfaces first absorbing or trapping the oil on their surface followed by a cleaning process.

It has been found that these devices are relatively inefficient in cleaning oil already mixed with sand, rocks and beaches and made more viscous where ambient temperatures are low, such as in the Arctic and North Sea.

While a number of devices are known and are used to remove oil from a beach or shoreline such use is sometimes impractical or inefficient. For example, soft, sandy beaches may not support heavy-land borne equipment such as bulldozers. Rocky beaches and those where indentations in the shoreline do not lend itself to sweeping beach-cleaning action present additional problems. Beyond that high pressure hoses whereby detergents are used to blast over rocky surfaces may disrupt the ecological environment by dislodging life forms on the rock surface and subsurface in addition to dislodging but not removing the oil. While not all oil removal can be effected on the beach areas, when floating craft using oil-water separating booms and conduits have been used, they have been relatively ineffective in rough seas when waves and breakers disturb the through-flow into the booms. As described in U.S. Pat. No. 4,061,569. Even certain improvements, such as the oceal intake system described in U.S. Pat. No. 4,673,497, suffers from oil-spill clean up from beaches and shoreline.

The need to visually and carefully locate the areas on beach surfaces where oil is washed-up and is contaminating the area is vital for efficiency and for maintaining and restoring the environmental integrity.

It is an object of the present invention to provide a method and apparatus to facilitate the clean-up of oil spills from shorelines, beaches and rocky areas which are not oleophilic.

It is another object of this invention to provide hand-held vacuum devices easily directed to oil pools, and oil covered areas on beaches, shorelines and the like so that the oil can be effectively removed.

It is still another object of this invention to provide a multi-vessel scheme comprising a shoreward first oil up-take and transfer vessel, connected to a second seaward vessel to hold and then transfer the collected oil to a third or more vessel for disposing of the collected oil spilled.

BRIEF DESCRIPTION OF THE DRAWINGS

FIG. 4 is a schematic side view of the vacuum head or nozzle apparatus.

SUMMARY OF THE INVENTION

Figure 2:
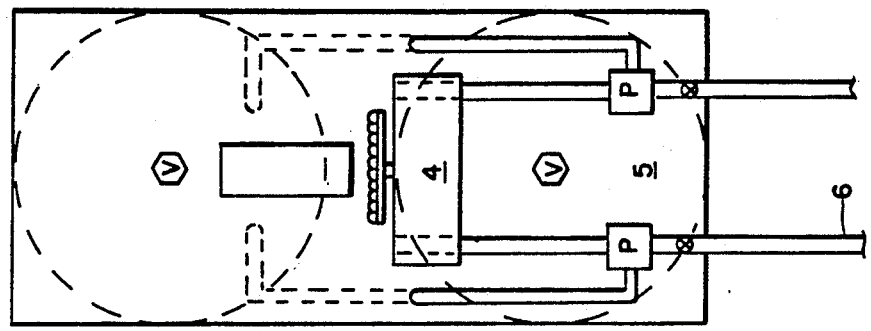
FIG. 2 is a schematic top view of the first vessel (barge) showing compressor system for barge to vessel #2 hoses.
Figure 1:
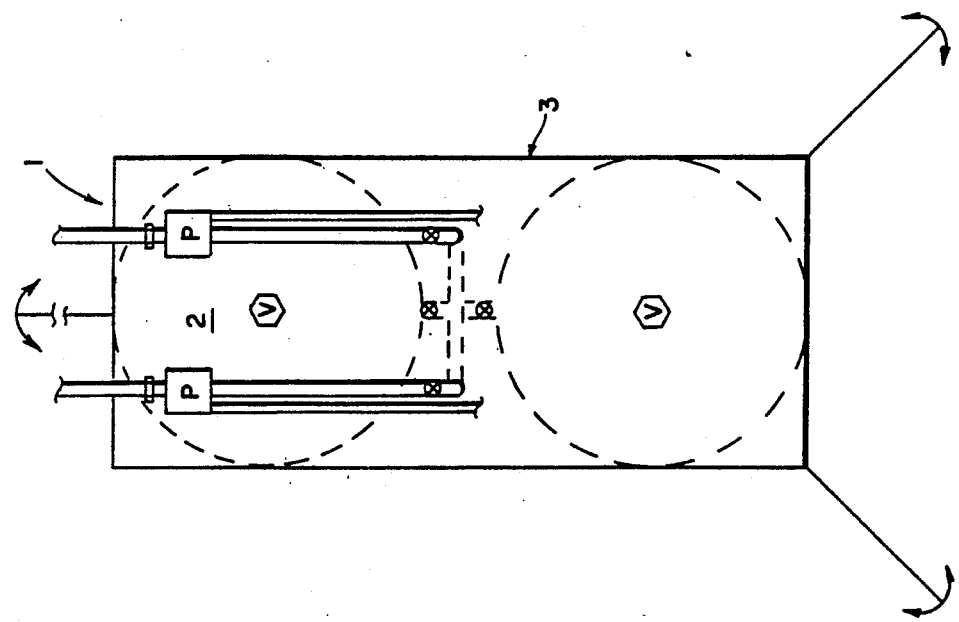
FIG. 1 is a schematic top view of the first vessel (barge) showing vacuum system for barge-to-shore hoses.
Figure 3:
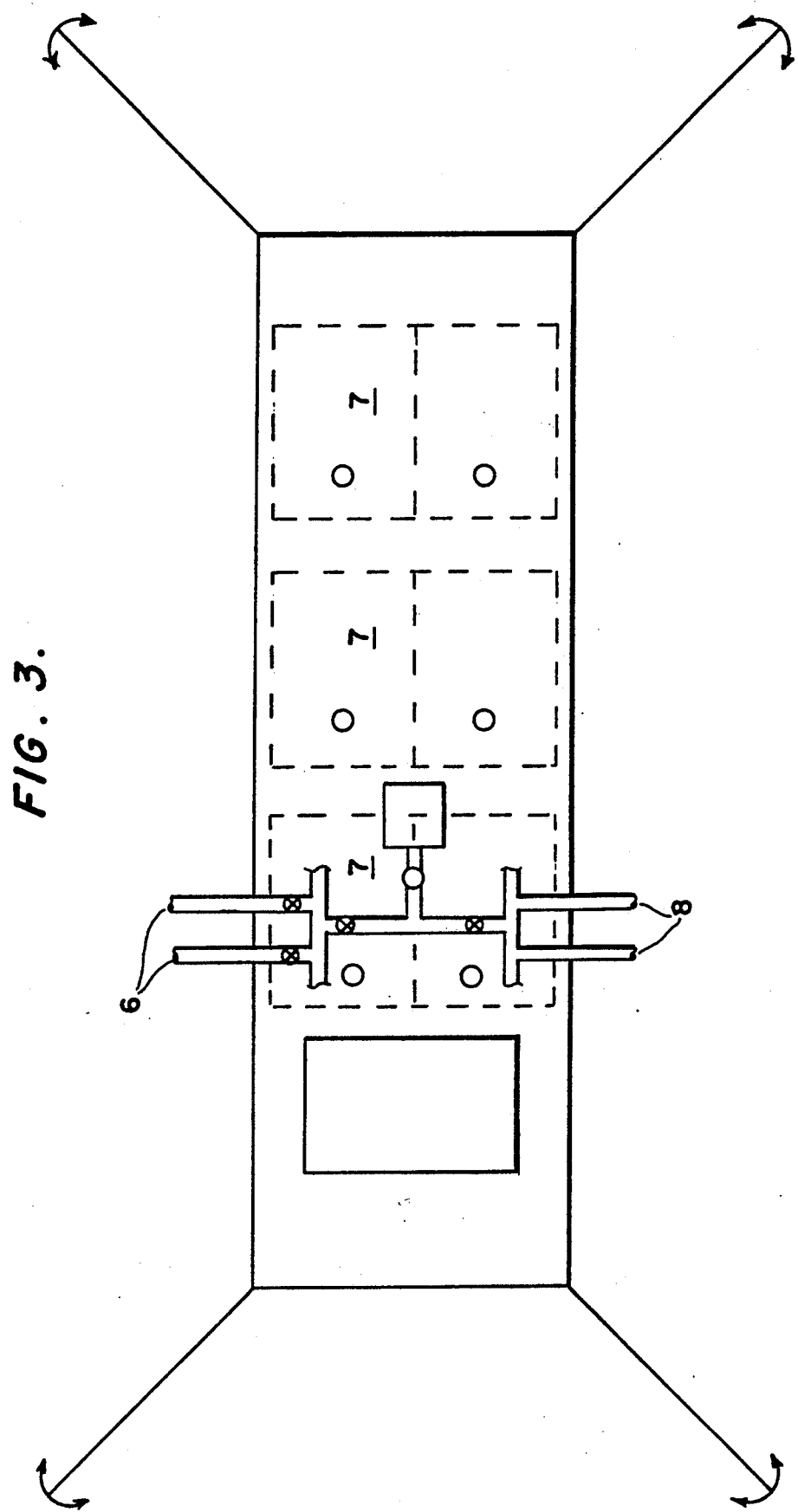
FIG. 3 is a schematic top view of vessel 2.

The present invention provides a thorough convenient, and cost-effective method for removing oil from surface land-sea areas such as beaches, shorelines and the like whose surfaces are non-oleophilic. This method employs oil collecting means operated by persons on the beach or shore, said means being vacuum assisted. These means comprise one or more take-up hoses of sufficient diameter to permit the viscous oil to freely flow under the reduced pressure of the vacuum. The hoses are suitably fitted with nozzles and perforated take-up sections to avoid picking up debris and rocks.

The hosing is drawn from one shore to a take-up and collecting barge, preferably having a shape, draft and design to permit its close proximity to the oil-contaminated area. The hosing is of such flexibility length and light weight as to permit the barge to be anchored and secured while the cleanup proceeds. In order to insure the ease of movement which may be required for the length of hose needed to traverse the affected beach and shoreline area, derrick-like apparatus on the barge can be used effectively.

In order to facilitate the continuous operation of oil-spill recovery and take-up, the barge is in turn connected to an off shore vessel which is equipped to receive the collected spill. This connection is maintained by flexible pipe which transports the retrieved-oil from the beach by way of the barge. The barge is equipped with pumping means to transfer, under pressure the oil so recovered. In those instances where area clean-up is substantially continuous in nature, the barge can move slowly or stop yet sill convey the oil to the second vessel lying farther offshore and away from the spill area. This holding vessel can easily move from the area when its oil holding capacity is filled, to be replaced by another similar vessel. In that way, the clean-up can continue uninterrupted.

The initial oil manually operated uptake procedure has the distinct advantage of permitting the handler to seek out those oil contaminated areas and thoroughly work the area until substantially clean. This is far more efficient than the hit-or-miss action of the skimming devices dependent on the water and wave action to float the oil into the traps and skimming troughs. By the method of this invention, oil clean-up is not wind or current effected on the operator's seeking out the oil on the beach or sandy shore, or otherwise on the non oleophilic surfaces such as rocks. In those instances where the hose from ship to shore is elongated, the present invention includes floating devices or buoys to maintain the oil-return pipe or tubing while almost any flexible tubing of various diameters such as rubber, plastic and the like can be used, it has been found that 4" polyethylene which is impervious to petroleum products such as crude.. oil is most satisfactory. In those instances where the oil viscosity is very high, a greater diameter can be used such as 8". In yet another aspect of this invention, the offshore (i.e., non collecting barge) vessel can be secured fore and aft on all sides and transfer the oil to other vessels such as barges to finally remove the oil. This can be done by compressed air sources such as pumps on this vessel or vacuum means on the transport vessels from which the oil can be finally removed and reprocessed.

The apparatus of the invention comprises at least one cylindrically shaped take up suction-means for manual operation having a flexible tube or pipe connected to the shoreward-barge. This suction means consists of a perforated thimble-like seive, through which the oil is picked up and through which stones, pebbles and debris cannot enter the tubing. Handles, holders or devices similar to facilitate holding and guiding the suction means are also provided and positioned on the shaft.

The suction means of this invention is preferably an air conveyor system and the motor and source of the suction can be preferably on the shoreside uptake barge or on any other vessel between the suction apparatus and the source of the suction.

In order to maximize the uptake of oil on the shore, the nozzle should be placed as nearby as possible to the oil pool or the surfaces where the oil has covered so that the oil can flow easily into the suction head. While it is possible that sand, debris and the like can occlude the uptake perforations in the vacuum nozzle, that can easily be cleaned by moving it rapidly through the water back and forth or by replacing the head. These heads or nozzles are preferably threaded on the tubing which is accommodated to receive it in an air-tight manner so as to maintain the vacuum pressure.

Still another form of this nozzle or head comprises a slidable sleeve positioned between the conveying tubing and the nozzle head. By the use of "O" rings or other similar locking devices, the sleeve can be placed so as to maintain the vacuum during the oil-uptake process and, if the perforated uptake member becomes clogged with debris, pebbles and the like can be slid, unlocking the "O" ring and breaking the vacuum to release the debris.

The heads are made of any suitable material such as high impact polymeric plastics, resins or plastics such as acrylics, vinyls, polyesters styrenes and the like and of a flexible, semiflexible or semi rigid quality, while metal heads can be used they are likely to dent and bend out of shape and are less preferred.

DETAILED DESCRIPTION OF THE INVENTION

This invention provides a method for removing oil such as that caused by spills, ruptured tanks and the like from surfaces such as shorelines, sandy beaches, and coastal areas covered with rocks, pebbles and the like which surfaces are not oleophilic. The method encompassed herein provides for the hand-held apparatus, one or more in number, having a nozzle head (9) with perforated intake means (10). Further removed from the oil-immersible end is a threaded securing means (11) attaching the nozzle and the conveying tube. An outer, slidable sleeve, used to maintain the vacuum pressure (12) can be moved over the perforated portion of the had for oil uptake and is moved in the opposite direction toward the conveying hose (13) to break the vacuum system. This is useful in dislodging debris which may attach during oil recovery.

The conveying means comprising flexible tubing or hose is connected from the shoreline, or beach operation to a barge or suitably stable vessel having an air conveyor or vacuum motor means (2) in communication with air lines to the vacuum pumps and manifold (3). The oil recovered and collected is caused to flow in the recovery system so that while it reaches the barge vessel #1 under vacuum, it is them pumped under pressure from a compressor (4) to a stand-by vessel #2 seaward of the barge. This is accomplished by oil transfer hoses (6). Vessel #2 is secured in its offshore position by anchors, preferably placed at all corners to insure platform stability. Contained within this vessel are a series of receiving tanks (7) for the recovered oil which is later transferred to other offshore vessel #3, by hoses (8) of flexible, oil impervious design. The transfer of this oil is made under pressure and the oil so collected is then processed for further use. It is also desirable to have vessel #2, employ skimmers or other suitable booms to deflect and contain any oil which may still be sea-borne so that the once-cleaned area can remain clean and substantially oil-free.

It will be understood that modern techniques for oil spill cleanups sometimes include use of hot water, steam and various detergent solutions to assist in washing the affected area. Consequently the initial uptake of oil is not likely to consist only of oil but also mixtures of oil-water-detergent. The separation and recovery of usable product can easily be effected by methods known to those skilled in the art.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

I claim:
1. An apparatus for removing oil from a shoreline, comprising
   a first vessel,
   means on said vessel for storing oil,
   a flexible tubing connected at one end to said storing means,
   a collection nozzle connected to the other end of the flexible tubing,
   means for creating vacuum in said flexible tubing, to enable said nozzle to collect oil from said shoreline,
   a second vessel situated seaward from said first vessel, and
   a conduit extending between said first and second vessels for transferring collected oil from said first vessel to said second vessel.

* * * * *